(12) United States Patent
Miyano et al.

(10) Patent No.: US 12,039,451 B2
(45) Date of Patent: Jul. 16, 2024

(54) INFORMATION PROCESSING DEVICE, CONTROL METHOD, AND PROGRAM

(71) Applicant: NEC Corporation, Tokyo (JP)

(72) Inventors: Hiroyoshi Miyano, Tokyo (JP); Tetsuaki Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 741 days.

(21) Appl. No.: 17/059,678

(22) PCT Filed: Jun. 1, 2018

(86) PCT No.: PCT/JP2018/021207
§ 371 (c)(1),
(2) Date: Nov. 30, 2020

(87) PCT Pub. No.: WO2019/229979
PCT Pub. Date: Dec. 5, 2019

(65) Prior Publication Data
US 2021/0209396 A1 Jul. 8, 2021

(51) Int. Cl.
*G06N 3/084* (2023.01)
*G06F 18/2415* (2023.01)
(Continued)

(52) U.S. Cl.
CPC ......... *G06N 3/084* (2013.01); *G06F 18/2415* (2023.01); *G06N 3/08* (2013.01);
(Continued)

(58) Field of Classification Search
CPC .......... G06N 3/084; G06N 3/08; G06N 3/047; G06F 18/2415; G06V 10/25; G06V 10/764; G06V 40/10; G06T 7/00
See application file for complete search history.

(56) References Cited

U.S. PATENT DOCUMENTS

| 2015/0125074 A1* | 5/2015 | Yu | G06T 7/90 |
| | | | 382/164 |
| 2016/0162738 A1* | 6/2016 | Miyano | G06T 7/277 |
| | | | 348/143 |

(Continued)

FOREIGN PATENT DOCUMENTS

| JP | 2012-159958 A | 8/2012 |
| JP | 2013-077202 A | 4/2013 |

(Continued)

OTHER PUBLICATIONS

Liu et al., "SSD: Single Shot MultiBox Detector," ECCV 2016, https://arxiv.org/pdf/1512.02325v5.pdf; Dec. 29, 2016, 17 pages.

(Continued)

*Primary Examiner* — John W Lee
(74) *Attorney, Agent, or Firm* — Sughrue Mion, PLLC

(57) ABSTRACT

An information processing apparatus (2000) generates likelihood data for each of a plurality of partial regions (12) in image data (10). The likelihood data are data being associated with a position and a size on the image data (10) and indicating a likelihood that a target object exists in an image region at the position with the size. The information processing apparatus (2000) computes a distribution (probability hypothesis density: PHD) of an existence likelihood of a target object with respect to a position and a size by computing the total sum of likelihood data each piece of which is generated for each partial region (12). The information processing apparatus (2000) extracts, from the PHD, partial distributions each of which relates to one target object. For each extracted partial distribution, the information processing apparatus (2000) outputs a position and a size of a target object represented by the partial distribution, based on a statistic of the partial distribution.

9 Claims, 13 Drawing Sheets

(51) Int. Cl.
*G06N 3/047* (2023.01)
*G06N 3/08* (2023.01)
*G06T 7/00* (2017.01)
*G06V 10/25* (2022.01)
*G06V 10/764* (2022.01)
*G06V 40/10* (2022.01)

(52) U.S. Cl.
CPC .......... *G06V 10/25* (2022.01); *G06V 10/764* (2022.01); *G06V 40/10* (2022.01)

(56) References Cited

U.S. PATENT DOCUMENTS

| | | | |
|---|---|---|---|
| 2016/0253570 A1* | 9/2016 | Nonogaki | G06V 40/113 382/159 |
| 2017/0206431 A1* | 7/2017 | Sun | G06V 10/454 |
| 2018/0005046 A1* | 1/2018 | Miyano | G06T 7/254 |

FOREIGN PATENT DOCUMENTS

| | | |
|---|---|---|
| WO | WO-2015-008432 A1 | 1/2015 |
| WO | WO-2016-114134 A1 | 7/2016 |

OTHER PUBLICATIONS

International Search Report and Written Opinion corresponding to PCT/JP2018/021207, mailing date Jul. 31, 2018, 8 total pages.

* cited by examiner

INFORMATION PROCESSING DEVICE, CONTROL METHOD, AND PROGRAM

CROSS-REFERENCE TO RELATED APPLICATIONS

This patent application is a national stage application of International Application No. PCT/JP2018/021207 entitled "INFORMATION PROCESSING DEVICE, CONTROL METHOD, AND PROGRAM," filed on Jun. 1, 2018, the disclosure of which is hereby incorporated by reference in its entirety.

TECHNICAL FIELD

The present invention relates to a technology of detecting an object from an image.

BACKGROUND ART

Technologies of detecting an object from image data have been developed. For example, Patent Document 1 discloses a technology of performing object detection by use of a deep neural network. A system in Patent Document 1 generates a feature map of image data by use of a convolutional neural network and, by inputting the generated feature map to a neural network called a region proposal network (RPN), outputs many proposals of rectangular regions (region proposals) each of which including an object. The system further estimates a class of an object included in a region proposal by performing classification in a layer called a box-classification layer. The system also adjusts a position and a size of a region proposal by performing regression in a layer called a box-regression convolutional layer.

Further, a system in Non Patent Document 1 generates a plurality of feature maps by use of a convolutional neural network and outputs many object proposals from each feature map. The each object proposal includes rectangular coordinates and a likelihood of an object class.

Many erroneous outputs not being correct answers are included in the aforementioned outputs in both the technique in Patent Document 1 and the technique in Non Patent Document 1. Therefore, a detection result to be finally output is acquired out of many object proposals by performing processing of reducing neighboring and significantly overlapping region proposals, the processing being called non-maximum suppression.

RELATED DOCUMENT

Patent Document

[Patent Document 1] United States Patent Application Publication No. 2017/0206431, Specification

Non-Patent Document

[Non Patent Document 1] Wei Liu, Dragomir Anguelov, Dumitru Erhan, Christian Szegedy, Scott E. Reed, Cheng-Yang Fu, and Alexander C. Berg, "Single Shot MultiBox Detector," ECCV 2016

SUMMARY OF THE INVENTION

Technical Problem

In Patent Document 1 and Non Patent Document 1, a case of significantly overlapping objects is eliminated as erroneous detection, and therefore a case of significant overlap is conversely not considered; and it is conceivable that a plurality of overlapping objects are erroneously detected as a single object in such a case.

The present invention has been made in view of the aforementioned problem and provides a technology capable of distinctively detecting objects even when the objects overlap each another in image data.

Solution to Problem

An information processing apparatus according to the present invention includes: 1) a generation unit configured to acquire image data and generate likelihood data representing a likelihood of existence of a target object with respect to a position and a size for each of a plurality of partial regions included in the image data; 2) an extraction unit configured to compute a distribution of a likelihood of existence of a target object with respect to a position and a size by computing a total sum of likelihood data each piece of which is generated for each partial region and extract, from the computed distribution, one or more partial distributions each of which relates to one target object; and 3) an output unit configured to, for each extracted partial distribution, output a position and a size of a target object relating to the partial distribution, based on a statistic of the partial distribution.

A control method according to the present invention is executed by a computer. The control method includes: 1) a generation step of acquiring image data and generating likelihood data representing a likelihood of existence of a target object with respect to a position and a size for each of a plurality of partial regions included in the image data; 2) an extraction step of computing a distribution of a likelihood of existence of a target object with respect to a position and a size by computing a total sum of likelihood data each piece of which is generated for each partial region and extracting, from the computed distribution, one or more partial distributions each of which relates to one target object; and 3) an output step of, for each extracted partial distribution, outputting a position and a size of a target object relating to the partial distribution, based on a statistic of the partial distribution.

A program according to the present invention causes a computer to execute each step included in the control method according to the present invention.

Advantageous Effects of the Invention

The present invention provides a technology capable of distinctively detecting objects even when the objects overlap each another in image data.

BRIEF DESCRIPTION OF THE DRAWINGS

The aforementioned object, other objects, features and advantages will become more apparent by use of the following preferred example embodiments and accompanying drawings.

DESCRIPTION OF EMBODIMENTS

Example embodiments of the present invention will be described below by use of drawings. Note that, in all drawings, a similar sign is given to similar components, and description thereof is omitted as appropriate. Further, each block in each block diagram represents a function-based configuration rather than a hardware-based configuration unless otherwise described.

Example Embodiment 1

Outline

Figure 1:
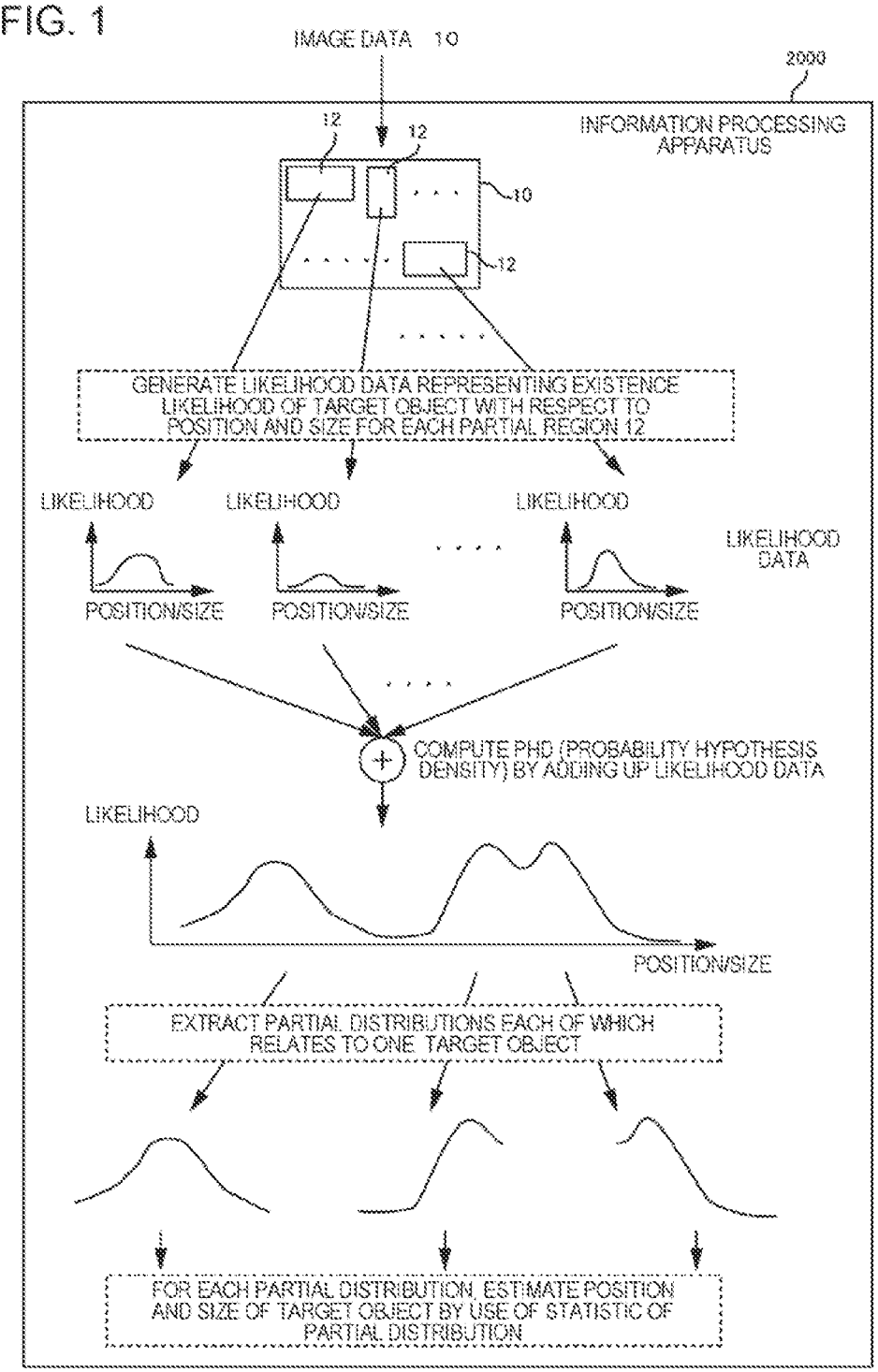
FIG. 1 is a diagram conceptually illustrating processing performed by an information processing apparatus according to the example embodiment 1.

FIG. 1 is a diagram conceptually illustrating processing performed by an information processing apparatus 2000 according to the present example embodiment. The information processing apparatus 2000 acquires image data 10 and detects a target object from the image data 10. Detection of a target object means determination of a position and a size of an image region (such as a circumscribed rectangle) including the target object from the image data 10. Any object may be handled as a target object, or only a specific type of object (such as only a human) may be handled as a target object.

The information processing apparatus 2000 detects an object by a method described below. First, the information processing apparatus 2000 generates parameters representing likelihood data for each of a plurality of partial regions 12 in the image data 10. The likelihood data are data being associated with a position and a size on the image data 10 and indicating a distribution of a likelihood that a target object exists in an image region at the position with the size. Specifically, denoting a predetermined probability density function the integral of which is 1 as f and a generated parameter as L, likelihood data is expressed by L×f.

For example, a normal distribution the position and the variance of which vary for each partial region may be used as the probability density function f, or a δ function may be used for expressing existence at a specific position only, or another probability density function may be adopted. Note that a δ function represents a function taking infinity only at a specific value, taking 0 at the other values, and having an integral value of 1.

The integral value of the likelihood data L×f matches the value of the generated parameter L. The likelihood data in FIG. 1 indicate such a distribution. Further details of the likelihood data will be described later.

The information processing apparatus 2000 computes a distribution of an existence likelihood of a target object with respect to a position and a size by computing the total sum of likelihood data each piece of which is generated for each partial region 12. The distribution is a so-called probability hypothesis density (PHD). The PHD is a distribution function having a characteristic that the integrated value matches the number of existing objects. The information processing apparatus 2000 extracts, from the PHD, partial distributions each of which relates to one target object (hereinafter referred to as partial distributions). Ideally, each of the partial distributions is extracted in such a way that the integral value thereof is 1, and each partial distribution relates to one target object.

Three partial distributions are extracted from a PHD in FIG. 1. The integrated value of the PHD is 3, and partial distributions are extracted in such a way that the integral of each partial distributions is 1. Note that while the three partial distributions are extracted in such a way as not to overlap each other in FIG. 1, the partial distributions may be extracted in such a way as to overlap each other. For example, while each integral value becomes 1 when a shape of a partial distribution is limited to a normal distribution, the partial distributions may be determined in such a way as to minimize the error between the sum of the partial distributions and the PHD. Alternatively, each partial distribution may be limited to a normal distribution×a weight. The integral value matches the weight in the case of the limitation, and therefore the partial distributions may be determined in such a way as to minimize the total sum of the error between the sum of the partial distributions and the PHD, and the error between the weight value and 1. Alternatively, a distribution other than a normal distribution may be adopted as a limited distribution shape.

For each extracted partial distribution, the information processing apparatus 2000 outputs a position and a size of a target object represented by the partial distribution, based on a statistic such as the mean of the partial distribution. For example, a position of a target object is represented by coordinates of a predetermined position (such as an upper-left corner) of a circumscribed rectangle representing the target object. For example, a size of a target object can be represented by a width and a height of a rectangular region representing the target object.

Note that while each distribution illustrated in FIG. 1 is depicted two-dimensionally (horizontal axis: position/size× vertical axis: likelihood) for convenience of illustration, the distribution is actually a distribution on a three-or-more-dimensional space. For example, it is assumed that a position of an image region is represented by coordinates, the shape of the image region is a rectangle, and the size of the rectangle is represented by a width and a height. In this case, each distribution illustrated in FIG. 1 is expressed on a five-dimensional (X coordinate, Y coordinate, width, height×likelihood) space.

Advantageous Effects

As described above, the information processing apparatus 2000 according to the present example embodiment detects a target object by a method of computing a PHD by adding up likelihood data each piece of which is computed for each partial region, and extracting a partial distribution representing one target object. The method enables highly precise distinction even between significantly overlapping target objects and detection of the target objects as separate target objects. The reason will be described below with reference to FIG. 2.

Figure 2:
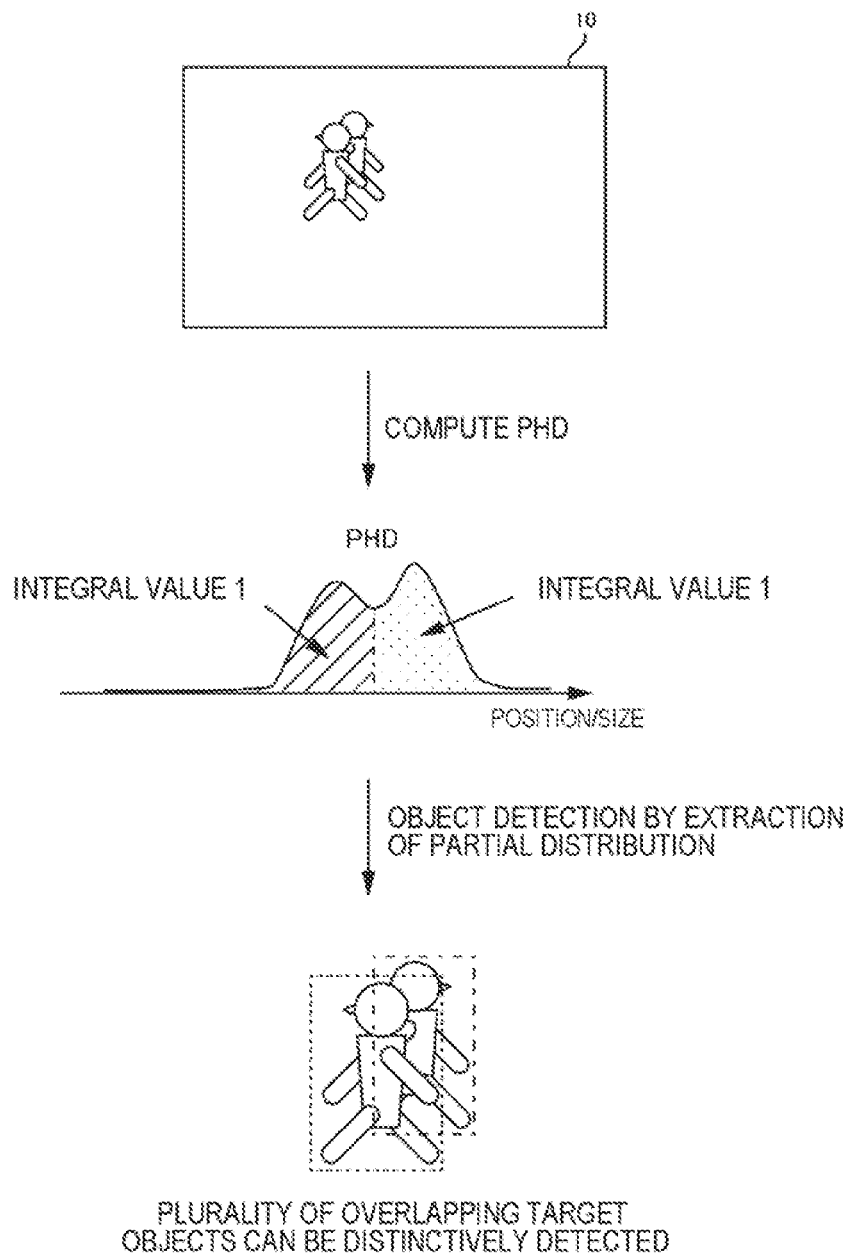
FIG. 2 is a diagram illustrating image data including target objects significantly overlapping each other.

FIG. 2 is a diagram illustrating image data 10 including significantly overlapping target objects. The image data 10 is a captured image of a scene in which two persons pass each other. When persons are correctly detected from the image data 10, two persons are detected. However, it is difficult to distinctively detect persons being significantly overlapping objects by existing techniques, and the probability of the two persons being collectively detected as one person is high.

With regard to this point, the information processing apparatus 2000 according to the present example embodiment generates a PHD acquired by adding up likelihood data each piece of which is generated for each partial region 12. The integrated value in any section of the PHD represents the number of target objects in the section. Thus, in the information processing apparatus 2000, information about the number of target objects is included in a PHD being information acquired by integrating information acquired from each partial region 12. By thus checking an integral value of a PHD including information about the number of target objects, each target object can be precisely detected even from image data including significantly overlapping target objects.

Specifically, a partial distribution the integral value of which is 1 is extracted from a PHD. This enables separation of significantly overlapping target objects and acquisition of a probability distribution of a position and a size of an image region relating to each target object. For example, a shaded partial distribution and a dotted partial distribution are extracted from a PHD in FIG. 2. Then, by determining a position and a size of a target object for each extracted partial distribution, each target object can be detected.

Note that the aforementioned description with reference to FIG. 1 and FIG. 2 is an exemplification for ease of understanding of the information processing apparatus 2000 and does not limit the functions of the information processing apparatus 2000. The information processing apparatus 2000 according to the present example embodiment will be described in more detail below.

Example of Functional Configuration of Information Processing Apparatus 2000

Figure 3:
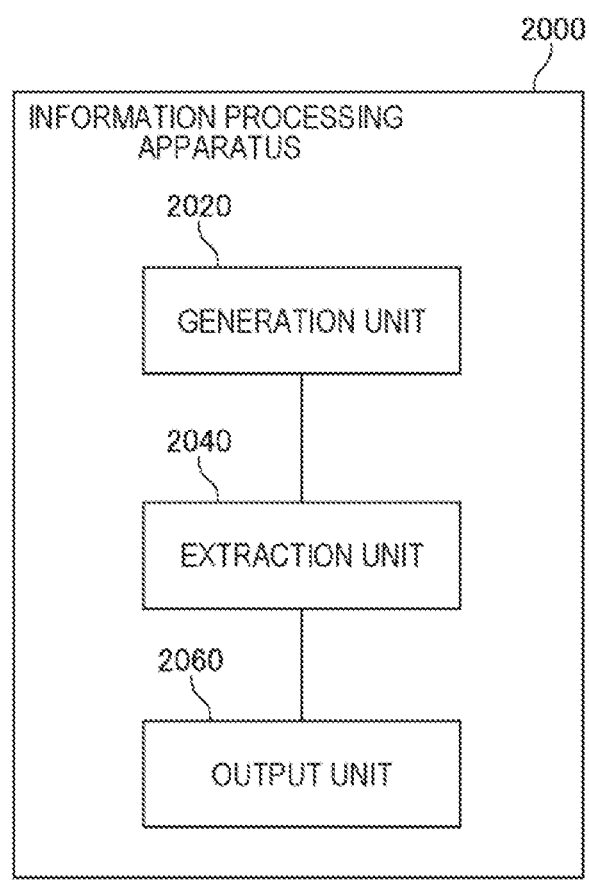
FIG. 3 is a diagram illustrating a functional configuration of the information processing apparatus according to the example embodiment 1.

FIG. 3 is a diagram illustrating a functional configuration of the information processing apparatus 2000 according to the example embodiment 1. The information processing apparatus 2000 includes a generation unit 2020, an extraction unit 2040, and an output unit 2060. The generation unit 2020 acquires image data 10 and generates likelihood data for each of a plurality of partial regions 12 included in the image data 10. The extraction unit 2040 computes a PHD by computing the total sum of likelihood data each piece of which is generated for each partial region 12. The extraction unit 2040 extracts, from the computed PHD, one or more partial distributions each of which relates to one target object. For each extracted partial distribution, the output unit 2060 outputs a position and a size of a target object represented by the partial distribution, based on a statistic of the partial distribution.

Hardware Configuration of Information Processing Apparatus 2000

Each functional configuration unit in the information processing apparatus 2000 may be provided by hardware (such as a hardwired electronic circuit) providing each functional configuration unit or may be provided by a combination of hardware and software (such as a combination of an electronic circuit and a program controlling the circuit). The case of each functional configuration unit in the information processing apparatus 2000 being provided by a combination of hardware and software will be further described below.

Figure 4:
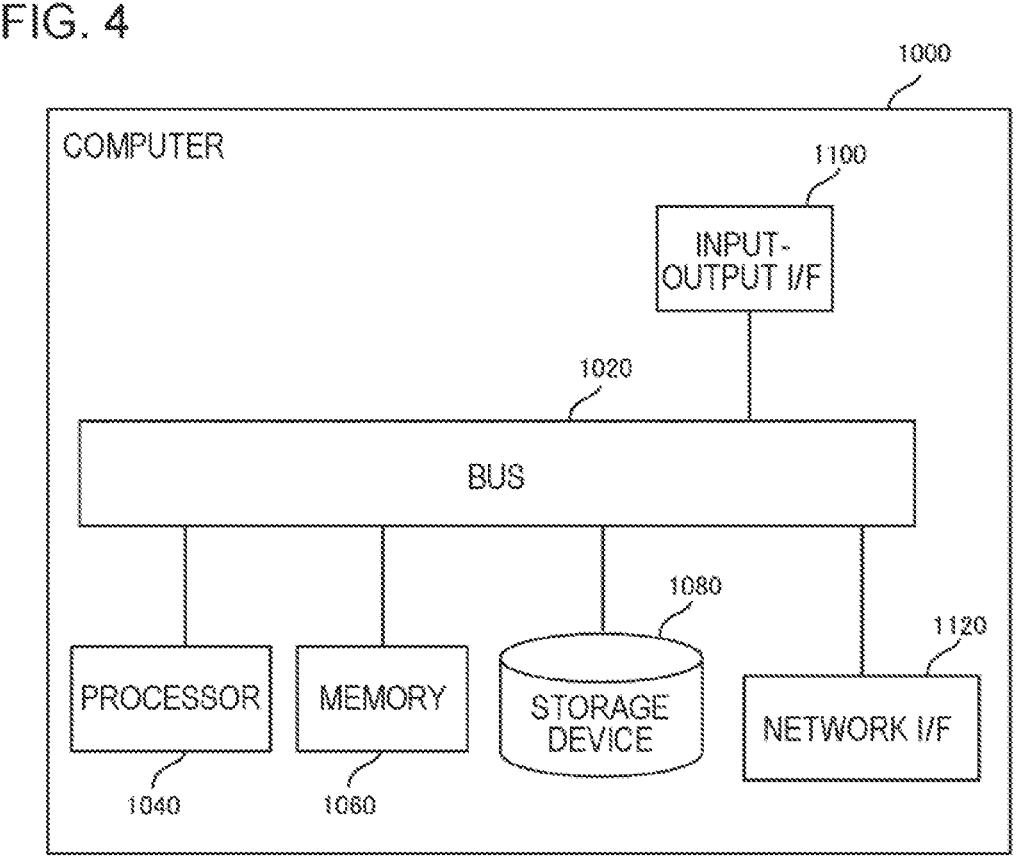
FIG. 4 is a diagram illustrating a computer for providing the information processing apparatus.

FIG. 4 is a diagram illustrating a computer 1000 for providing the information processing apparatus 2000. The computer 1000 may be any computer. Examples of the computer 1000 include a personal computer (PC) and a server machine. The computer 1000 may be a dedicated computer designed for providing the information processing apparatus 2000 or may be a general-purpose computer.

The computer 1000 includes a bus 1020, a processor 1040, a memory 1060, a storage device 1080, an input-output interface 1100, and a network interface 1120. The bus 1020 is a data transmission channel for the processor 1040, the memory 1060, the storage device 1080, the input-output interface 1100, and the network interface 1120 to mutually transmit and receive data. However, a method of connecting the processor 1040 and the like to each another is not limited to the bus connection.

The processor 1040 includes various processors such as a central processing unit (CPU), a graphics processing unit (GPU), and a field-programmable gate array (FPGA). The memory 1060 is a main storage provided by use of a random access memory (RAM) and/or the like. The storage device 1080 is an auxiliary storage provided by use of a hard disk, a solid state drive (SSD), a memory card, a read only memory (ROM), and/or the like.

The input-output interface 1100 is an interface for connecting the computer 1000 to an input/output device. For example, the input-output interface 1100 is connected to an input apparatus such as a keyboard and an output apparatus such as a display apparatus. The network interface 1120 is an interface for connecting the computer 1000 to a communication network. Examples of the communication network include a local area network (LAN) and a wide area network (WAN). A method of connecting the network interface 1120 to the communication network may be a wireless connection or a wired connection.

The storage device 1080 stores a program module providing each functional configuration unit in the information processing apparatus 2000. The processor 1040 provides a function relating to each program module by reading the program module into the memory 1060 and executing the program module.

Processing Flow

Figure 5:
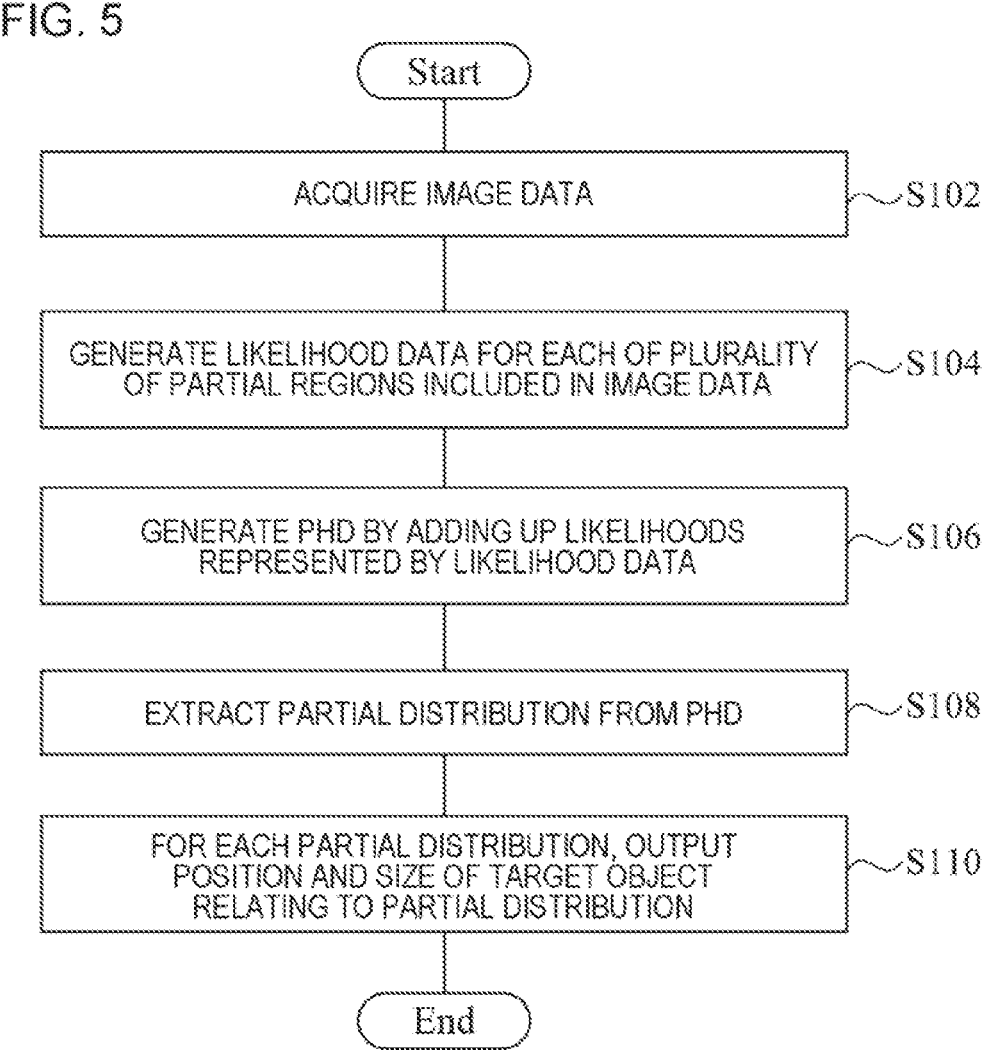
FIG. 5 is a flowchart illustrating a flow of processing executed by the information processing apparatus according to the example embodiment 1.

FIG. 5 is a flowchart illustrating a flow of processing executed by the information processing apparatus 2000 according to the example embodiment 1. The generation unit 2020 acquires image data 10 (S102). The generation unit 2020 generates likelihood data for each of a plurality of partial regions 12 included in the image data 10 (S104). The extraction unit 2040 computes a PHD by adding up likelihoods represented by the likelihood data (S106). The extraction unit 2040 extracts one or more partial distributions from the PHD (S108). For each partial distribution, the output unit 2060 outputs a position and a size of a target object relating to the partial distribution (S110).

The information processing apparatus 2000 may execute a series of processes illustrated in FIG. 5 in response to any trigger. For example, the information processing apparatus 2000 executes the aforementioned series of processes in response to input of the image data 10. In addition, for example, the information processing apparatus 2000 may execute the aforementioned series of processes in response to a predetermined input operation by a user.

Acquisition of Image Data 10: S102

The generation unit 2020 acquires image data 10 (S102). Any image data may be used as the image data 10. For example, the image data 10 are a captured image generated by a camera. The camera may be a still camera or a video camera. Note that "a captured image generated by a camera" may be a captured image generated by a camera itself or an image acquired by applying some processing on a captured image generated by a camera.

When a captured image is used as the image data 10, the information processing apparatus 2000 may be provided inside a camera generating the image data 10. For example, by providing the information processing apparatus 2000 inside a surveillance camera, an object can be detected in real time from a surveillance video generated by the surveillance camera. For example, types of camera called an intelligent camera, an Internet Protocol (IP) camera, and a network camera can be used as a camera incorporating the function of the information processing apparatus 2000.

The generation unit 2020 may acquire image data 10 by any method. For example, the generation unit 2020 acquires image data 10 from a storage storing the image data 10. The storage storing the image data 10 may be provided inside the information processing apparatus 2000 or may be provided outside. In addition, for example, the information processing apparatus 2000 acquires image data 10 input by an input operation by a user. In addition, for example, the generation unit 2020 acquires image data 10 by receiving the image data 10 transmitted by another apparatus.

Partial Region 12

A partial region 12 is a partial image region included in the image data 10. A partial region 12 is different from another partial region 12 with respect to at least either one of a position and a size.

Figure 6:
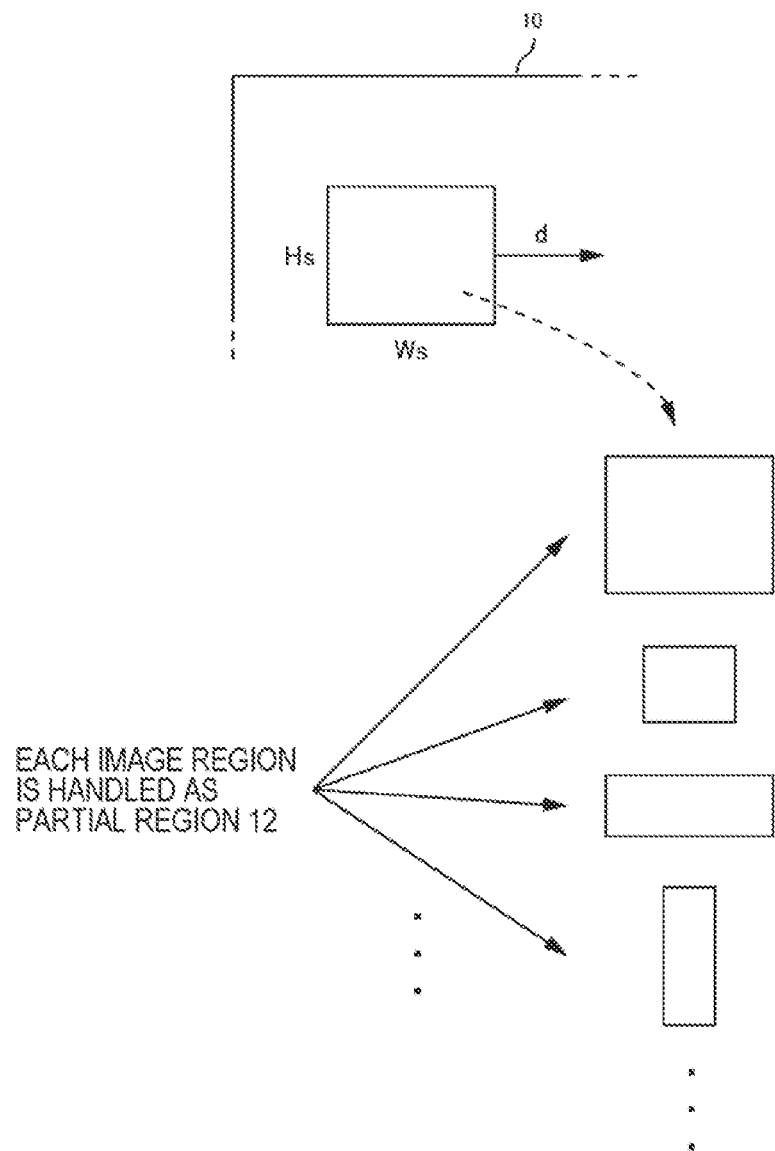
FIG. 6 is a diagram illustrating a method of extracting a partial region by use of a sliding window.

The generation unit 2020 extracts each partial region 12 included in the image data 10 and, by analyzing the extracted partial region 12, generates likelihood data for the partial region 12. For example, a partial region 12 can be extracted by use of a sliding window. FIG. 6 is a diagram illustrating a method of extracting a partial region 12 by use of a sliding window. The information processing apparatus 2000 moves a sliding window with a predetermined size (width: Ws, height: Hs) at a predetermined stride d. A plurality of image regions with different sizes are extracted from the sliding window at various positions and each image region is handled as a partial region 12. Thus, partial regions 12 with varying positions and sizes can be extracted. Note that, for example, a technique using an Anchor box disclosed in Patent Document 1 can be used to extract as a thus partial region 12.

A partial region 12 may be extracted from a feature map generated from the image data 10 instead of being directly extracted from the image data 10. In this case, for example, a neural network 20 to be described later is constituted of a layer for extracting a feature map from the image data 10 (such as a convolutional layer in a convolutional neural network) and a layer for extracting a partial region 12 from a feature map output from the layer and generating likelihood data.

A shape of a partial region 12 is not necessarily limited to a rectangle. For example, when a shape of a partial region 12 is a perfect circle, the partial region 12 can be represented by center coordinates and a length of a radius. Further, when a partial region 12 is represented by a set of vertices, a polygon in any shape can be handled as a partial region 12. In this case, both a position and a size of the partial region 12 is determined by a set of vertices of the partial region 12.

Generation of Likelihood Data: S104

Figure 7:
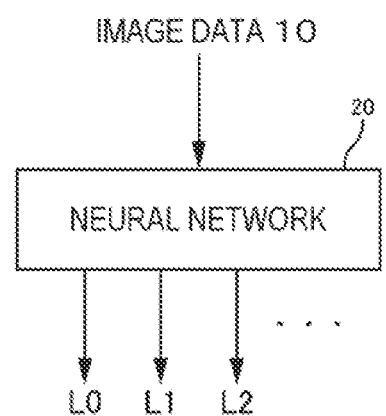
FIG. 7 is a diagram illustrating a neural network used for generation of likelihood data.

The generation unit 2020 generates parameters representing likelihood data for each of a plurality of partial regions 12 included in the image data 10 and generates likelihood data (S104). For example, parameters representing likelihood data are generated by use of a neural network. FIG. 7 is a diagram illustrating a neural network used for generation of parameters representing likelihood data. In response to input of the image data 10, a neural network 20 outputs, for each partial region 12 included in the image data 10, a likelihood Li that a target object exists in an image region with the position and the size of the partial region 12. Li is a likelihood output for an i-th partial region 12.

For example, the generation unit 2020 sets a distribution determined based on a likelihood Li as likelihood data.

Figure 8:
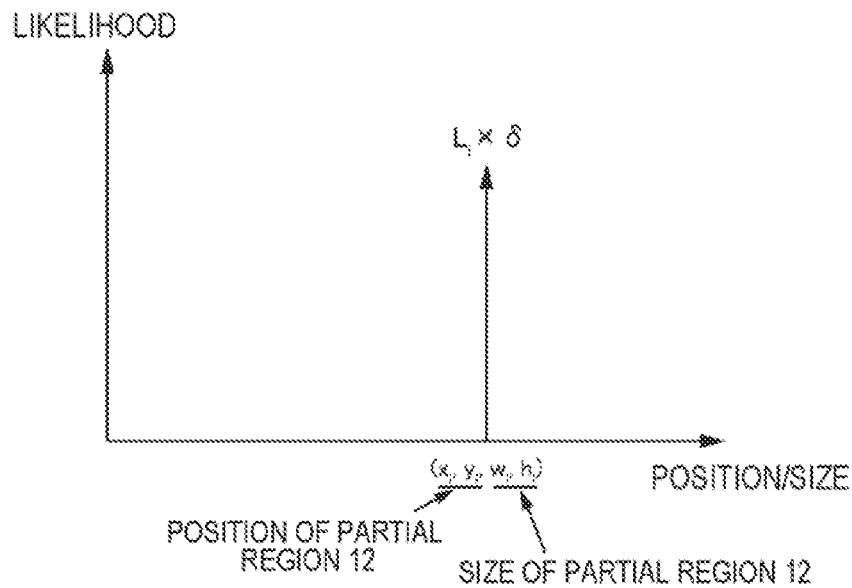
FIG. 8 is a diagram conceptually illustrating likelihood data generated based on a likelihood Li.
Figure 8:
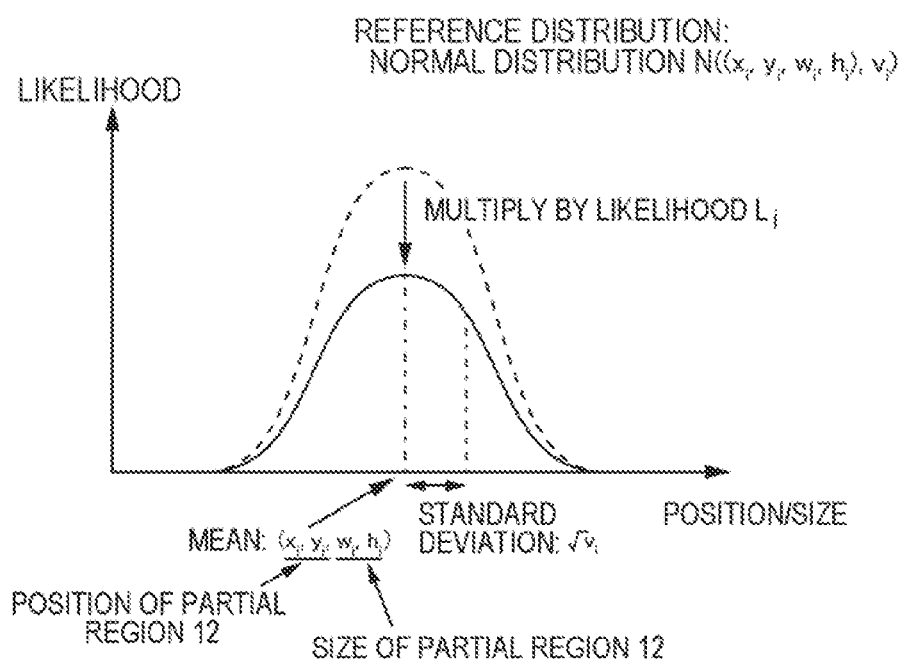

FIG. 8 is a diagram conceptually illustrating likelihood data generated based on a likelihood Li. In the upper part of FIG. 8, likelihood data represent a distribution having a variance of 0 and being generated based on a likelihood Li. The distribution is expressed as Li×δ function by use a δ function.

On the other hand, likelihood data in the lower part of FIG. 8 represent a distribution with a nonzero variance. For example, a distribution conforming to a predetermined model such as a normal distribution is predetermined as a distribution as a reference (hereinafter referred to as a reference distribution). When a normal distribution is used, for example, a reference distribution may be determined as a distribution having 1 as the integral value, the position and the size of the partial region 12 as the mean, and a predetermined value as the variance. Any value may be set to the variance.

The generation unit 2020 generates likelihood data by multiplying a reference distribution by a likelihood Li. For example, in the lower part of FIG. 8, a reference distribution model is a normal distribution. Then, based on the position (xi, yi) of the partial region 12 and the size (wi, hi) of the partial region 12, the mean of the reference distribution is (xi, yi, wi, hi). Further, the variance of the reference distribution is vi. From the above, the reference distribution is N[(xi, yi, wi, hi), vi]. Furthermore, a likelihood output from the neural network 20 is Li. Then, the generation unit 2020 generates a distribution indicating the likelihood data by multiplying the reference distribution by Li. The integral value of a distribution of the acquired likelihood data is Li.

A reference distribution conforming to a distribution model may not be predetermined, and parameters of a distribution model may be output from the neural network 20. For example, when a normal distribution is used, parameters of a distribution model are the aforementioned mean and variance. Then, the neural network 20 outputs a mean and a variance for each partial region 12.

Figure 9:
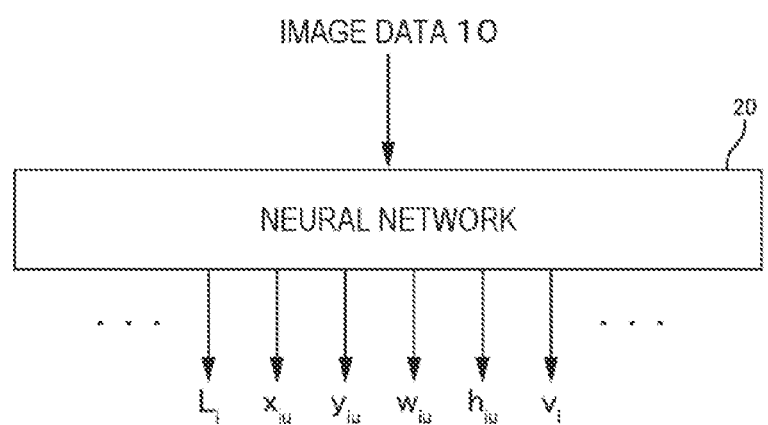
FIG. 9 is a diagram illustrating a neural network outputting parameters of a normal distribution indicated by likelihood data.

FIG. 9 is a diagram illustrating the neural network 20 outputting parameters of a normal distribution indicated by likelihood data. In FIG. 9, "a likelihood Li, (xiu, yiu, wiu, hiu) representing the mean of a normal distribution, and the variance vi of the normal distribution" are output for each partial region 12. Then, by multiplying the normal distribution determined by the mean and the variance output from the neural network 20 by the likelihood Li for each partial region 12, the generation unit 2020 generates a distribution indicated by the likelihood data.

The position (xi, yi) output from the neural network 20 may be different from the original position of a relating i-th partial region 12. Similarly, the size (wi, hi) output from the neural network 20 may be different from the original size of the relating i-th partial region 12. The reason is that, as will be described later, the neural network 20 adjusts and outputs the position and the size of the partial region 12 in such a way as to increase a likelihood that a target object is included in the partial region 12 by causing the neural network 20 to perform learning in such a way as to output an ideal PHD.

Note that the neural network 20 does not necessarily output all parameters of the distribution model and may output only part of the parameters. For example, the mean of the normal distribution is output from the neural network 20, and a predetermined value is used as the variance.

In order to make the neural network 20 perform the operation described above, it is necessary to cause the neural network 20 to previously perform learning in such a way that such an operation is performed. A learning method of the neural network 20 will be described later. Note that any structure may be used as an internal structure (such as the number and an order of layers, a type of each layer, and a connection relation between the layers) of the neural network. For example, the same structure as that of the region proposal network (RPN) described in Patent Document 1 may be adopted as the structure of the neural network 20. Alternatively, the network described in Non Patent Document 1 may be used.

Note that generation of likelihood data does not necessarily need to be performed by use of a neural network, and another existing technique of, for each of a plurality of partial regions in image data, computing a likelihood that a target object is included in the partial region may be used.

Extraction of Partial Distribution: S108

The extraction unit 2040 extracts one or more partial distributions from the PHD. A partial distribution is a probability distribution representing, with respect to a partial region including one target object, an existence probability of a target object with respect to the position and the size of the partial region. A partial distribution is a probability distribution, and the integral value thereof is 1.

First, the extraction unit 2040 computes the number of target objects included in the image data 10, based on the PHD. Specifically, the extraction unit 2040 computes the integral value of the PHD and determines the computed integral value to be the number of target objects included in the image data 10. However, it is conceivable that the integral value of the PHD does not completely match the number of target objects due to an error or the like and is not a natural number. Then, in this case, the extraction unit 2040 handles an approximate value (such as a value acquired by dropping the fractional portion) of the integral value of the PHD as the number of target objects.

Figure 10:
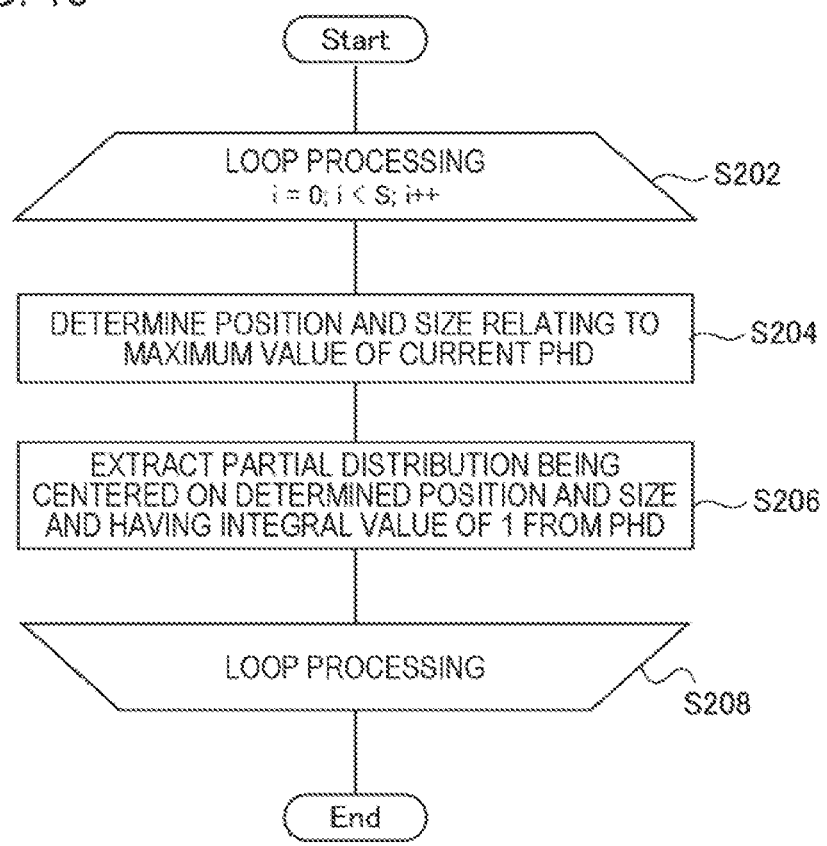
FIG. 10 is a flowchart illustrating a flow of processing of extracting a partial distribution on the basis of the maximum value of a PHD.

The extraction unit 2040 extracts the computed number of partial distributions from the PHD. For example, the extraction unit 2040 extracts partial distributions from the PHD on the basis of the maximum value of the PHD. FIG. 10 is a flowchart illustrating a flow of processing of extracting partial distributions on the basis of the maximum value of the PHD. Loop processing illustrated in the flowchart in FIG. 10 is repeatedly executed while a counter i is less than the integral value S of the PHD. The counter i is initialized to 0 at first and is incremented by 1 every time the loop processing is executed. In this case, the number of partial distributions is a maximum integer equal to or less than S.

In S202, the extraction unit 2040 determines whether the counter i is less than S.

When i is less than S, the processing in FIG. 10 advances to S204. On the other hand, when i is equal to or greater than S, the processing in FIG. 10 ends.

The extraction unit 2040 determines a position and a size relating to the maximum value of the PHD (S204). The extraction unit 2040 extracts a partial distribution being centered on the position and the size and having the integral value of 1 from the PHD (removes the partial distribution from the PHD) (S206). Since S208 is the end of the loop processing, the processing returns to S202.

In addition to the method illustrated in FIG. 10, any space clustering technique may also be used as a method of extracting partial distributions from a PHD. For example, denoting each output result as Li and a preset probability density function as fi, a PHD can be written as the total sum $\Sigma i(Li \times fi)$ of the output results. Hierarchical clustering of computing a distance between positions represented by all output results Li, adding output results at a short distance from each other, and decreasing the total number down to a predetermined number may be adopted. At this time, since it is desirable that Li be as close to 1 as possible, for example, processing of, when adding an output i and an output i', comparing "the square mean of $(1-Li)$ and $(1-Li')$" with "the square of the difference between Li+Li' and 1" and not performing the addition processing when the former is smaller may be performed. Alternatively, various clustering techniques may be performed and a result with the minimum square sum of $(1-Li)$ may be selected.

Output of Result: S110

For each extracted partial distribution, the output unit 2060 outputs a position and a size of a target object represented by the partial distribution (S110). Specifically, the output unit 2060 determines the position and the size of the target object, based on a statistic of the partial distribution. For example, the output unit 2060 determines the mean of the partial distribution to be the position and the size of the target object. In addition, for example, the output unit 2060 may determine a position and a size relating to the maximum value of the partial distribution to be the position and the size of the target object. Then, the output unit 2060 outputs the determined position and size for each partial distribution.

Figure 11:
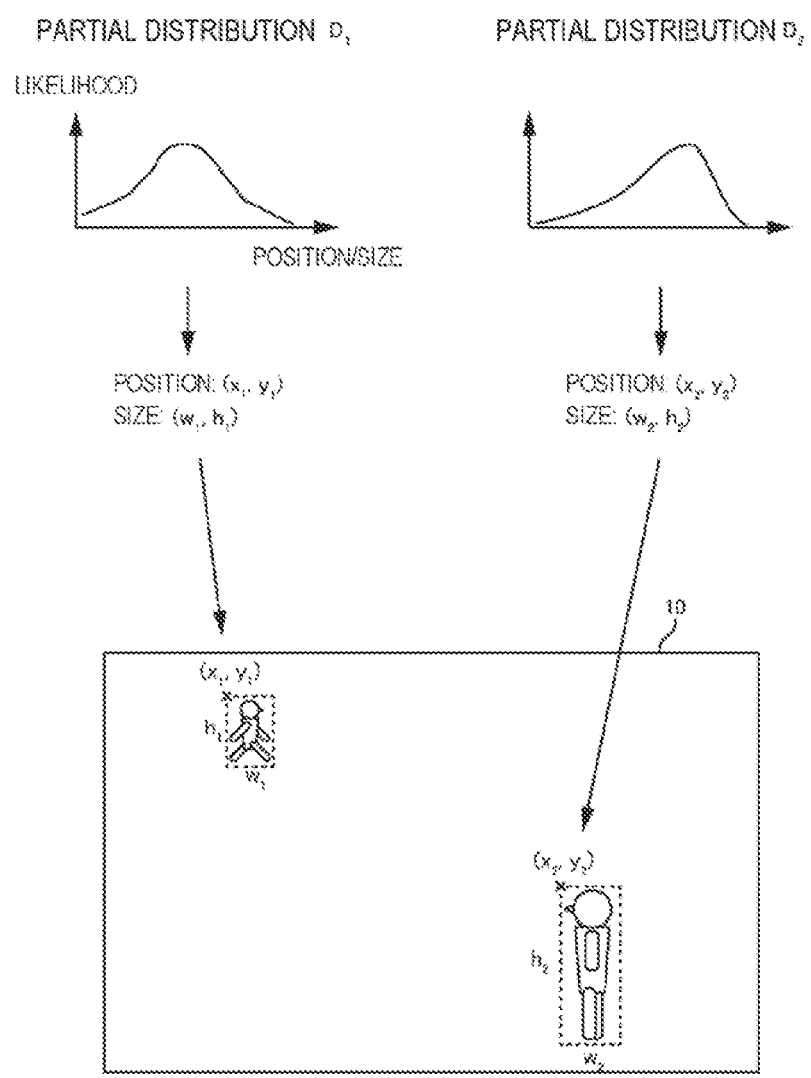
FIG. 11 is a diagram illustrating a position and a size of a target object determined based on a partial distribution.

FIG. 11 is a diagram illustrating a position and a size of a target object determined based on a partial distribution. In FIG. 11, two partial distributions D1 and D2 are extracted from a PHD. The output unit 2060 determines a position (x1, y1) and a size (w1, h1) of a target object, based on the partial distribution D1. Similarly, the output unit 2060 determines a position (x2, y2) and a size (w2, h2) of a target object, based on the partial distribution D2. From the above, each of an image region at the position (x1, y1) with a width w1 and a height h1, and an image region at the position (x2, y2) with a width w2 and a height h2 represents a target object.

The output unit 2060 outputs a position and a size of a target object in various forms. For example, the output unit 2060 stores, into a storage, data (such as a list) indicating, for each target object, a combination of "an identifier assigned to the target object, the position of the target object, and the size of the target object" in association with the image data 10. Note that any method may be used as a method of assigning an identifier to an object detected from image data.

In addition, for example, the output unit 2060 may output a display (such as frame) indicating a position and a size of a determined target object, the display being superposed on the image data 10, as illustrated in FIG. 11. The display may be output to any destination and may be output to, for example, a storage and/or a display apparatus.

Note that the output unit 2060 may further output the number of target objects. A computation method of the number of target objects is as described above.

Learning by Neural Network 20

Figure 12:
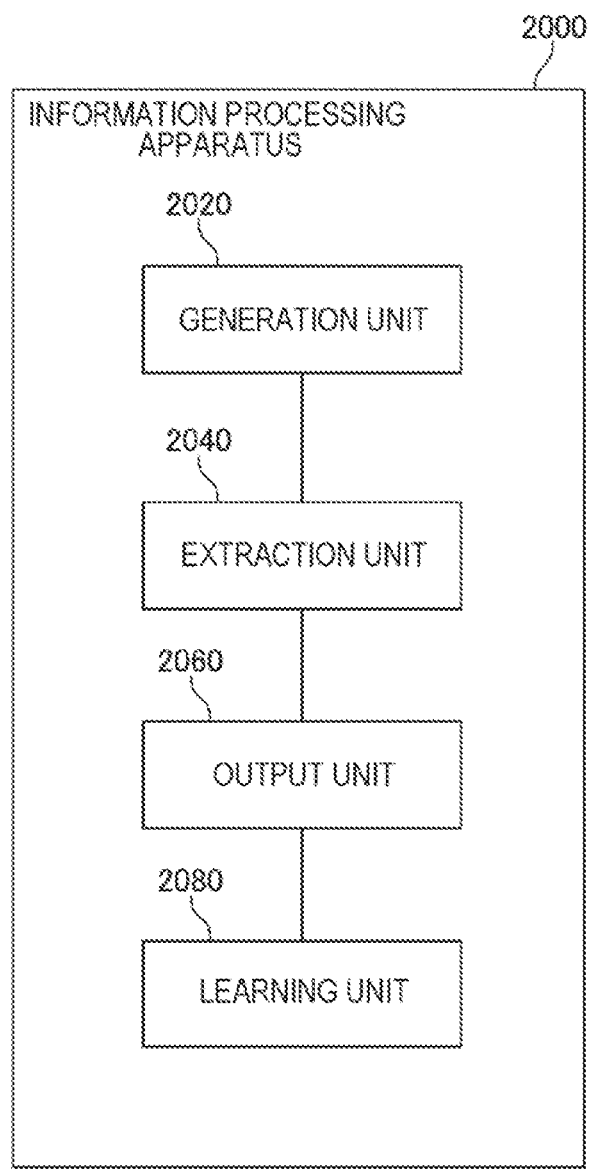
FIG. 12 is a block diagram illustrating an information processing apparatus having a function of learning by a neural network.

As described above, learning by the neural network 20 needs to be performed in advance. The learning by the neural network 20 may be performed by the information processing apparatus 2000 or may be performed by an apparatus other than the information processing apparatus 2000. The description herein assumes that the information processing apparatus 2000 performs the learning by the neural network 20. FIG. 12 is a block diagram illustrating the information processing apparatus 2000 having a function of performing learning by the neural network 20. The learning by the information processing apparatus 2000 is executed by a learning unit 2080.

The learning unit 2080 computes a predicted loss between a PHD based on an actual output of the neural network 20 and an ideal PHD. The ideal PHD may be expressed as the sum of normal distributions each of which being previously specified with a variance and being centered on a position of a rectangle representing an object being a correct answer. Alternatively, the ideal PHD may be handled as a δ function the variance of which is 0, or another function may be used. Next, learning by the neural network 20 is performed based on the predicted loss. More specifically, the learning unit 2080 performs learning by the neural network 20 by updating parameters (a weight value and a bias value) of the neural network 20 by propagating the computed predicted loss in inverse order (back propagating) from an output node in the neural network 20. Various existing methods such as a gradient descent method may be used as a method of performing learning by a neural network by back propagation based on a predicted loss. A determination method and a computation method of a predicted loss used in learning by the neural network 20 will be described below.

The learning unit 2080 computes a PHD relating to an actual output by use of the actual output acquired by inputting image data for learning (hereinafter referred to as learning image data) to the neural network 20. The learning unit 2080 further computes a predicted loss between the PHD relating to the actual output and an ideal PHD predetermined based on the learning image data. For example, the square error between the PHDs may be used as the predicted loss. Alternatively, since a PHD divided by the integral value can be handled as a probability density function the integral value of which is 1, any technique capable of handling a loss as an error between probability density functions may be used. For example, the minus value of the product of an ideal probability density function and a probability density function relating to the actual output may be determined as a loss. Alternatively, an error of the integral value may be handled as a loss, or several of the losses may be combined.

As a more specific example, denoting each output result as Li and a preset probability density function as fi, a PHD relating to an actual output can be written as $\Sigma i(Li \times fi)$. Further, denoting a position of a rectangle of each object being a correct answer as yj and a distribution as a basis for computing a PHD as gj, an ideal PHD can be written as $\Sigma j(gj)$. As a technique of minimizing an error between the two, one or a plurality of neighboring outputs i are previously assigned to each correct answer j. Denoting the number of the assigned outputs as Nj, an error between Li for assigned i and $(1/Nj)$, such as the square of $(Li-1/Nj)$, may be minimized. This is a technique for learning Li in such a way that the integral values match.

Figure 13:
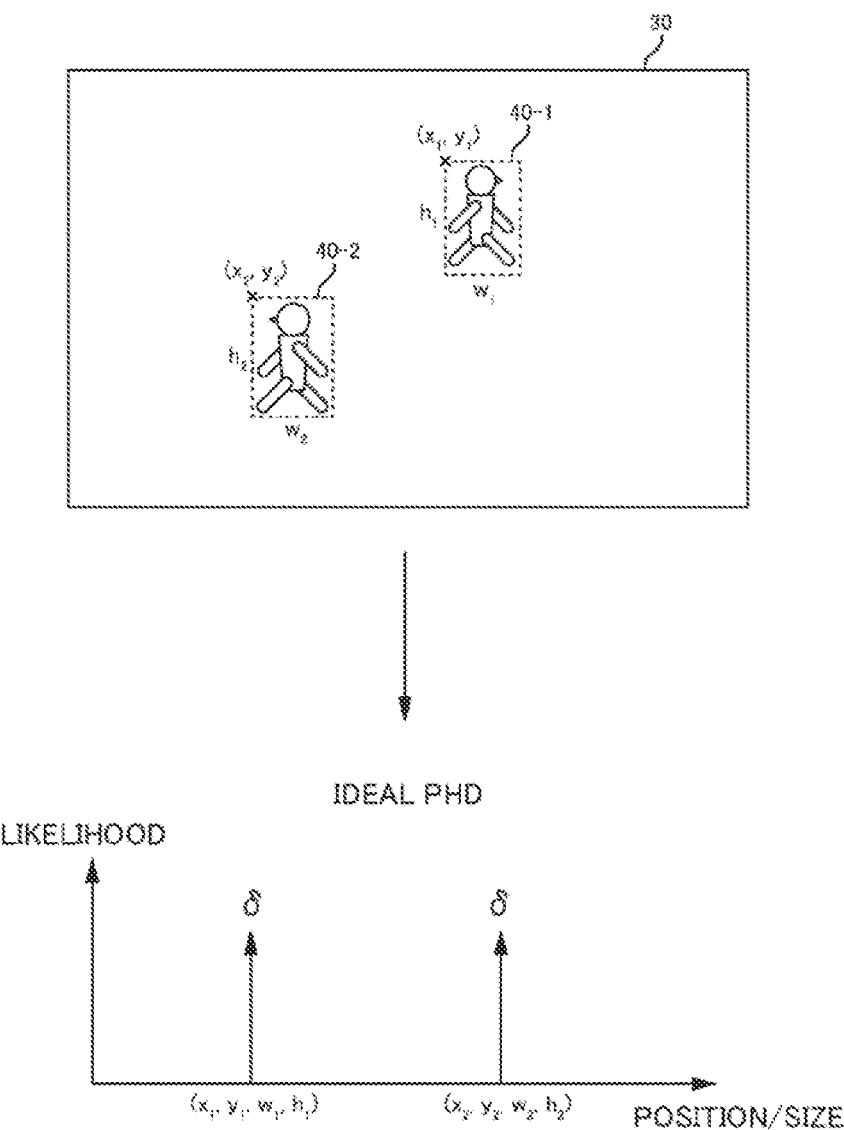
FIG. 13 is a diagram illustrating an ideal PHD.

With respect to each image region in which a target object exists in learning image data, an ideal PHD indicates a distribution (δ function) having a likelihood of 1 at a position of the position and the size of the image region and having a variance of 0. FIG. 13 is a diagram illustrating an ideal PHD. In learning image data 30 in FIG. 13, target objects are included in two image regions 40-1 and 40-2. The position and the size of the image region 40-1 are (x1, y1) and (w1, h1), respectively. Therefore, an ideal PHD indicates a δ function with a peak at (x1, y1, w1, h1). Further, the position and the size of the image region 40-2 are (x2, y2) and (w2, h2), respectively. Therefore, an ideal PHD indicates a δ function with a peak at (x2, y2, w2, h2).

For example, an ideal PHD relating to learning image data is previously generated by hand and is stored in a storage in association with the learning image data. The learning unit 2080 performs learning by the neural network 20 by use of one or more of thus prepared combinations of learning image data and an ideal PHD.

Example Embodiment 2

An information processing apparatus 2000 according to an example embodiment 2 distinctively handles a plurality of types of target objects. To do so, the generation unit 2020 according to the example embodiment 2 generates likelihood data for each of mutually different types of target objects. Therefore, likelihood data are generated for each type of target object for one partial region 12.

Further, an extraction unit 2040 according to the example embodiment 2 generates a PHD for each type of target object. This is achieved by adding up likelihood data for each type of target object. Then, the extraction unit 2040 extracts a partial distribution from each PHD.

An output unit 2060 according to the example embodiment 2 outputs a position and a size of a target object relating to each partial distribution. Each partial distribution relates to one type of target object. Then, the output unit 2060 outputs a position and a size of a target object relating to a partial distribution along with the type of the target object.

When the information processing apparatus 2000 is provided by use of a neural network 20, for example, the information processing apparatus 2000 includes a neural network 20 for each type of target object. Each neural network 20 previously performs learning in such a way as to detect a relating type of target object. For example, as for a neural network 20 handling a human as a target object, an ideal PHD is set to indicate a likelihood of 1 for a position and a size of an image region representing a human in learning image data and indicate a likelihood of 0 for a position and a size of another image region (an image region in which an object does not exist or an object other than a human exists).

Consequently, an ideal PHD is prepared for each type of target object for learning image data. A learning unit 2080 causes a neural network 20 for detecting a certain type of target object to perform learning by use of a combination of "learning image data and an ideal PHD for the type of target object."

Hardware Configuration Example

For example, a hardware configuration of a computer providing the information processing apparatus 2000 according to the example embodiment 2 is illustrated by FIG. 4, similarly to the example embodiment 1. However, a storage device 1080 in a computer 1000 providing the information processing apparatus 2000 according to the present example embodiment further stores a program module providing the function of the information processing apparatus 2000 according to the present example embodiment.

Advantageous Effects

The information processing apparatus 2000 according to the present example embodiment can detect a target object for each type thereof. Accordingly, positions of mutually different types of target objects can be recognized including the types thereof.

While the example embodiments of the present invention has been described above with reference to the drawings, the drawings are exemplifications of the present invention; and various configurations other than the above may be adopted.

The invention claimed is:

1. An information processing apparatus comprising:
   at least one memory configured to store a computer program; and
   at least one processor configured to execute the computer program to perform:
   acquiring image data and generating likelihood data representing a likelihood of existence of a target object with respect to a position and a size for each of a plurality of partial regions included in the image data;
   computing a distribution of the likelihood of existence of the target object with respect to the position and the size by computing a total sum of the likelihood data each piece of which is generated for the each partial region and extracting, from the computed distribution, one or more partial distributions each of which relates to the one target object; and
   outputting, for the each extracted partial distribution, the position and the size of the target object relating to the partial distribution, based on a statistic of the partial distribution,
   wherein with respect to the position and the size of the partial region, the likelihood data represent a distribution conforming to a predetermined model and indicating a likelihood that an object exists in the partial region with the position and the size,
   the computer program includes a neural network outputting the likelihood data for each of a plurality of partial regions included in image data and,
   the generating the likelihood data includes, by inputting the acquired image data to the neural network, generating the likelihood data for each of the plurality of partial regions included in the image data,
   for the each partial region, the neural network outputs the likelihood that the target object exists in the partial region and a parameter value of the predetermined model.

2. The information processing apparatus according to claim 1, wherein the extracting the one or more partial distributions includes;
   computing a number of one or more objects included in the image data, based on an integral value of a distribution represented by a total sum of the likelihood data, and
   extracting as many as the number of the partial distributions from the distribution represented by the total sum of the likelihood data.

3. The information processing apparatus according to claim 1, wherein the extracting the one or more partial distributions includes extracting the partial distributions an integral value of each of which is 1 from a distribution represented by a total sum of the likelihood data.

4. The information processing apparatus according to claim 1, wherein the generating likelihood data includes generating the likelihood data for each of mutually of mutually different types of the target objects,
   the computing the distribution of the likelihood includes, for each of mutually different types of the target objects, computing the distribution of the likelihood of existence of the target object,
   the one or more partial distributions is extracted from the distribution, and
   the outputting the position and the size of the target object includes outputting the position and the size of the target object relating to the each partial distribution along with a type of the target object relating to the partial distribution.

5. A control method executed by a computer, the control method comprising:
   acquiring image data and generating likelihood data representing a likelihood of existence of a target object with respect to a position and a size for each of a plurality of partial regions included in the image data;
   computing a distribution of the likelihood of existence of the target object with respect to the position and the size by computing a total sum of likelihood data each piece of which is generated for the each partial region and extracting, from the computed distribution, one or more partial distributions each of which relates to the one target object; and
   outputting, for the each extracted partial distribution, the position and the size of the target object relating to the partial distribution, based on a statistic of the partial distribution,
   wherein with respect to the position and the size of the partial region, the likelihood data represent a distribution conforming to a predetermined model and indicating a likelihood that an object exists in the partial region with the position and the size,
   a neural network is stored in the computer, outputting the likelihood data for each of a plurality of partial regions included in image data and,
   the generating the likelihood data includes, by inputting the acquired image data to the neural network, generating the likelihood data for each of the plurality of partial regions included in the image data,
   for the each partial region, the neural network outputs the likelihood that the target object exists in the partial region and a parameter value of the predetermined model.

6. The control method according to claim 5, wherein the extracting the one or more partial distributions includes;
   computing a number of one or more objects included in the image data, based on an integral value of a distribution represented by a total sum of the likelihood data, and
   extracting as many as the number of the partial distributions from the distribution represented by the total sum of the likelihood data.

7. The control method according to claim 5, wherein the extracting the one or more partial distributions includes extracting the partial distributions an integral value of each of which is 1 from a distribution represented by a total sum of the likelihood data.

8. The control method according to claim 5, wherein the generating likelihood data includes generating the likelihood data for each of mutually different types of the target objects,
   the computing the distribution of the likelihood includes, for each of mutually different types of the target objects, computing the distribution of the likelihood of existence of the target object,
   the one or more partial distributions is extracted, and the outputting the position and the size of the target object includes outputting the position and the size of the target object relating to the each partial distribution along with a type of the target object relating to the partial distribution.

9. A non transitory storage medium storing a program causing a computer to execute:

acquiring image data and generating likelihood data representing a likelihood of existence of a target object with respect to a position and a size for each of a plurality of partial regions included in the image data;

computing a distribution of the likelihood of existence of the target object with respect to the position and the size by computing a total sum of likelihood data each piece of which is generated for the each partial region and extracting, from the computed distribution, one or more partial distributions each of which relates to the one target object; and outputting, for the each extracted partial distribution, the position and the size of the target object relating to the partial distribution, based on a statistic of the partial distribution, wherein with respect to the position and the size of the partial region, the likelihood data represent a distribution conforming to a predetermined model and indicating a likelihood that an object exists in the partial region with the position and the size, a neural network is included in the program, outputting the likelihood data for each of a plurality of partial regions included in image data and, the generating the likelihood data includes, by inputting the acquired image data to the neural network, generating the likelihood data for each of the plurality of partial regions included in the image data, for the each partial region, the neural network outputs the likelihood that the target object exists in the partial region and a parameter value of the predetermined model.

* * * * *